(12) United States Patent
Roderick et al.

(10) Patent No.: US 6,976,215 B1
(45) Date of Patent: Dec. 13, 2005

(54) PUSHBUTTON USER INTERFACE WITH FUNCTIONALITY PREVIEW

(75) Inventors: Jayne B. Roderick, San Francisco, CA (US); Karon E. MacLean, Vancouver (CA); William L. Verplank, Menlo Park, CA (US); Scott S. Snibbe, San Francisco, CA (US)

(73) Assignee: Vulcan Patents LLC, Seattle, WA (US)

( * ) Notice: Subject to any disclaimer, the term of this patent is extended or adjusted under 35 U.S.C. 154(b) by 354 days.

(21) Appl. No.: 09/918,789

(22) Filed: Jul. 27, 2001

Related U.S. Application Data

(63) Continuation-in-part of application No. 09/740,587, filed on Dec. 18, 2000, now abandoned.

(60) Provisional application No. 60/172,980, filed on Dec. 20, 1999.

(51) Int. Cl.$^7$ .............................................. G09G 5/00
(52) U.S. Cl. ...................... 715/702; 715/701; 715/810; 715/812; 345/184
(58) Field of Search ................................ 345/702, 812, 345/701, 184; 715/702, 701, 812, 810

(56) References Cited

U.S. PATENT DOCUMENTS

| | | | |
|---|---|---|---|
| 5,714,978 A * | 2/1998 | Yamanaka et al. .......... 345/157 |
| 5,797,091 A * | 8/1998 | Clise et al. .............. 455/404.2 |
| 6,074,213 A * | 6/2000 | Hon ............................ 434/262 |
| 6,088,017 A * | 7/2000 | Tremblay et al. ........... 345/156 |
| 6,310,604 B1 * | 10/2001 | Furusho et al. ............. 345/156 |
| 6,343,349 B1 * | 1/2002 | Braun et al. ................. 711/154 |
| 6,424,356 B2 * | 7/2002 | Chang et al. ................ 345/701 |
| 6,496,122 B2 * | 12/2002 | Sampsell ............... 340/825.69 |
| 6,529,183 B1 * | 3/2003 | MacLean et al. ........... 345/156 |
| 2002/0135619 A1 * | 9/2002 | Allport ....................... 345/810 |

OTHER PUBLICATIONS

Peter Hall, *The Magic Button*, Nov. 1999, I.D. Magazine.

* cited by examiner

*Primary Examiner*—Ba Huynh
*Assistant Examiner*—Sara Hanne
(74) *Attorney, Agent, or Firm*—Van Pelt, Yi & James LLP

(57) ABSTRACT

A pushbutton user interface enables a user to preview the effect of activating a pushbutton of the interface before the pushbutton is activated. The pushbutton user interface can be implemented so that an input (preview input) to the pushbutton that does not produce an activation of the pushbutton is sensed and, in response to the sensed input, a preview is displayed that indicates the effect of activating the pushbutton. The preview input can be sensed using, for example, a force-sensitive resistor, potentiometer or strain gauge. The preview display can include, for example, a visual display, an audio display, a haptic display, or a combination of two or three such displays. The pushbutton user interface can be implemented so that the preview input and an activation input (i.e., an input that produces an activation of the pushbutton) are sensed as a result of an input to the pushbutton along the same axis or along different (e.g., orthogonal) axes.

19 Claims, 1 Drawing Sheet

PUSHBUTTON USER INTERFACE WITH FUNCTIONALITY PREVIEW

CROSS-REFERENCE TO RELATED APPLICATIONS

This application is a continuation-in-part of U.S. patent application Ser. No. 09/740,587 filed on Dec. 18, 2000, now abandoned which is a continuation of U.S. provisional patent application Ser. No. 60/172,980 filed on Dec. 20, 1999, the disclosures of which are hereby incorporated by reference herein.

BACKGROUND OF THE INVENTION

1. Field of the Invention

This invention relates to user interfaces and, in particular, to a pushbutton user interface that enables a user to preview the effect of activating a pushbutton before the pushbutton is actually activated.

2. Related Art

Pushbuttons provide binary control. Often, it is desirable to know what effect activating a pushbutton (i.e., actuating the pushbutton in a manner that produces the functionality associated with the pushbutton) will have before the pushbutton is activated. If the function of the pushbutton is constant, such as power on/off, the result of activating the pushbutton can often be known beforehand. However, if the function of the pushbutton can vary (such as is the case with a set of pushbuttons used to select pre-assigned radio stations), the result of activating the pushbutton may not be known with confidence beforehand. In such cases, it can be desirable to know what effect activating a pushbutton will have (e.g., which radio station a pushbutton will select) before committing to the activation. In particular, in a pushbutton user interface including multiple pushbuttons, it can be desirable to know what effect activating a particular pushbutton will have before the pushbutton is activated.

Graphical icons formed on, or attached to, pushbuttons have been used to explain the behavior of pushbuttons on devices such as remote control units. However, graphical icons can be confusing and non-intuitive, particularly when used to explain specialized functions.

A "mouse rollover" is a technique that has been used within the software user interface of a computer to explain the behavior of components of a graphical user interface of a computer. A mouse rollover occurs when a cursor or pointer is moved over a graphical icon or designated "hot spot" on the screen of a computer's display device. Text corresponding to the icon or hot spot (which typically identifies the function or content represented by the icon or hot spot) appears automatically; the mouse (or other user input device) doesn't have to be clicked (or otherwise activated) for the text to appear. The mouse rollover technique is used in numerous computer programs, such as, for example, Adobe Photoshop. In Photoshop, for instance, a menu bar is included for the selection of various drawing and design tools. A graphical icon represents each tool. A picture of a paintbrush, for example, represents the paintbrush tool. Textual explanations for each tool appear on-screen as a pointer is moved over the corresponding graphical icon. Selecting (e.g., clicking a mouse or activating another input device) the graphical icon launches the tool.

SUMMARY OF THE INVENTION

According to the invention, a pushbutton user interface enables a user to preview the effect of activating a pushbutton of the interface before the pushbutton is activated. By providing a pushbutton with such preview capability, there is less need to attempt to explain pushbutton functionality through other means (which may be confusing and non-intuitive), such as use of a graphical icon, as has previously been done. Pushbutton user interfaces incorporating preview capability in accordance with the invention can be less confusing to use than previous pushbutton user interfaces and can therefore enable the creation of simpler and more understandable interfaces for use in remote control units and other complex control devices.

In one embodiment of the invention, a pushbutton user interface enables a user to preview the effect of activating a pushbutton of the pushbutton user interface by sensing an input (preview input) to the pushbutton that does not produce an activation of the pushbutton and displaying, in response to the sensed input, a preview indicating the effect of activating the pushbutton. The preview input can be sensed using, for example, a force-sensitive resistor, potentiometer or strain gauge. The preview display can include, for example, a visual display, an audio display, a haptic display, or a combination of two or three such displays. The pushbutton user interface can be implemented so that the preview input and an activation input (i.e., an input that produces an activation of the pushbutton) are sensed as a result of an input to the pushbutton along the same axis or along different (e.g., orthogonal) axes.

The principles of the invention can also be embodied in user interface apparatus other than a pushbutton user interface. For example, the principles of the invention can be implemented in user interface apparatus in which input is provided via mechanical apparatus, such as a doorknob, a toggle switch or a rotary switch.

DETAILED DESCRIPTION OF THE INVENTION

According to the invention, a pushbutton user interface enables a user to preview the effect of activating a pushbutton of the interface before the pushbutton is activated. (The invention can be particularly advantageously implemented in a pushbutton user interface including multiple pushbuttons so that functionality preview capability is provided for multiple pushbuttons.) By providing a pushbutton with such preview capability, there is less need to attempt to explain pushbutton functionality through other means (which may be confusing and non-intuitive), such as use of a graphical icon, as has previously been done. Additionally, the invention can advantageously be implemented so that the explanation of the functionality of a pushbutton is closely tied to the actual experience of using the pushbutton. A pushbutton user interface incorporating preview capability in accordance with the invention can be less confusing to use than previous pushbutton user interfaces and can therefore enable the creation of simpler and more understandable interfaces for use in remote control units and other complex control devices. A pushbutton user interface according to the invention can advantageously enable preview of currently unused functionality of a device without interrupting ongoing use of functionality of that device (e.g., as described further below, a pushbutton user interface according to the invention can be used, while viewing one television channel, to display one or more other television channels as small picture-in-pictures within the display of the currently viewed television channel with relatively little disruption to the television channel being watched). The invention can be used in, for example, consumer electronics products, cell phones, cable television products, MP3 players, remote control devices, and professional video and audio equipment.

Figure 1:
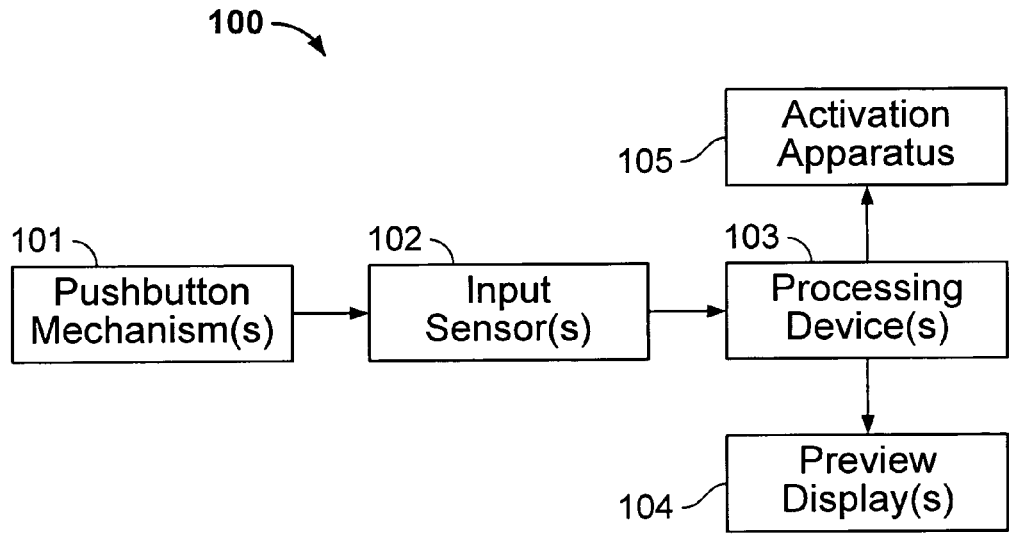
FIG. 1 is a block diagram of a pushbutton user interface apparatus according to the invention.

FIG. 1 is a block diagram of a pushbutton user interface apparatus 100 according to the invention. The pushbutton user interface apparatus 100 includes one or more pushbutton mechanisms 101, one or more input sensors 102, one or more processing devices 103, one or more preview displays 104 and activation apparatus 105, each of which are described in more detail below. The communication shown in FIG. 1 between components of the apparatus 100, including the directionality of that communication, is merely illustrative; it is to be understood that the invention contemplates any communication among the components of the apparatus 100, as can readily be understood by those skilled in the art, that enables the functionality of the apparatus 100, as described herein, to be achieved.

Each pushbutton mechanism 101 of the pushbutton user interface apparatus 100 enables a user to effect functionality associated with the pushbutton mechanism 101. For example, a pushbutton mechanism 101 can be used to select one of a multiplicity of radio stations or television channels (or, more generally, one of a multiplicity of any type of audio, visual or audiovisual channel). A pushbutton mechanism 101 can also be used to select a link displayed within a Web page. A pushbutton mechanism 101 can also be used to activate a function provided in a desktop computer application or to continuously control the degree of a function provided in a desktop computer application. A pushbutton mechanism 101 can also be used to open or unlatch a door.

A pushbutton mechanism 101 can be implemented using conventional apparatus known to those skilled in the art. For example, a pushbutton mechanism 101 can be implemented using a pushbutton cap that is compliantly supported with a spring so that pressing on the pushbutton cap causes the pushbutton cap to be displaced from a rest position at which the pushbutton cap is held by the spring when the pushbutton cap is not being pressed. Herein, such a pushbutton mechanism is sometimes referred to as a "displacement-type pushbutton mechanism." In a displacement-type pushbutton mechanism, pressing on the pushbutton cap can be sensed using a displacement sensor, force sensor or touch sensor. A pushbutton mechanism 101 can also be implemented using a pushbutton cap that is supported so that pressing on the pushbutton cap causes the pushbutton cap to be displaced negligibly or not at all. Herein, such a pushbutton mechanism is sometimes referred to as a "touch-sensitive pushbutton mechanism." In a touch-sensitive pushbutton mechanism, pressing on the pushbutton cap can be sensed using a force sensor or touch sensor (e.g., a temperature sensor that can be used to sense touch or a light sensor that can be used to infer touch from blockage of light in the vicinity of the light sensor.

In accordance with the invention, each pushbutton mechanism 101 can enable a user to provide an activation input and a preview input. An "activation input" is an input to a pushbutton mechanism 101 that produces an activation of the pushbutton mechanism 101, i.e., that produces the functionality associated with the pushbutton mechanism 101. (Examples of such functionality are discussed above.) A "preview input" is an input to a pushbutton mechanism 101 that does not produce an activation of the pushbutton mechanism 101 and that produces a display (preview display) indicating the effect of activating the pushbutton mechanism 101.

A pushbutton user interface apparatus 100 can be implemented so that both the preview input and the activation input are effected along the same axis and in the same direction. Such a pushbutton user interface apparatus 100 can be implemented, for example, so that an activation input is produced by depressing (displacing) a displacement-type pushbutton mechanism 101 more than a specified amount or applying greater than a specified force to a displacement-type or touch-sensitive pushbutton mechanism 101. A preview input can be produced in such a pushbutton user interface apparatus 100 by, for example, depressing a displacement-type pushbutton mechanism 101 less than a specified amount or by applying less than a specified force to a displacement-type or touch-sensitive pushbutton mechanism 101. Such a pushbutton user interface apparatus 100 can, but need not necessarily, further be implemented so that a preview input is only produced if a displacement-type pushbutton mechanism 101 is depressed by greater than a second specified amount or greater than a second specified force is applied to a displacement-type or touch-sensitive pushbutton mechanism 101 (the second specified amount or force being less than the first specified amount or force that defines an activation input). Further, such a pushbutton user interface apparatus 100 can be implemented so that when a preview input is produced, the content of a preview display that results from a preview input can vary in accordance with the amount by which the pushbutton mechanism 101 is depressed or the degree of force applied to the pushbutton mechanism 101. Implementing the pushbutton user interface apparatus 100 so that both the preview input and the activation input are effected along the same axis and in the same direction has the advantage that the pushbutton user interface apparatus 100 can typically be constructed more easily and cheaply than an implementation of the pushbutton user interface apparatus 100 in which the preview and activation inputs are effected in different directions or along different axes. A pushbutton user interface apparatus 100 implemented in this manner may also be easier to use, since both the activation and preview inputs are controlled in the same manner using the same apparatus.

A pushbutton user interface apparatus 100 can alternatively be implemented so that the preview input and the activation input are effected in opposite directions along the same axis or along different axes. Such a pushbutton user interface apparatus 100 can be implemented, for example, so that an activation input is produced by pressing (displacing or applying a force to) a pushbutton mechanism 101 in a direction along a first axis and a preview input is produced by pressing (displacing or applying a force to) the pushbutton mechanism 101 in a direction along a second, lateral axis (i.e., along an axis orthogonal to the axis along which the pushbutton mechanism 101 is pressed to produced the activation input), an input sensor 102 being provided to sense displacement or force along the second axis. Alternatively, the pushbutton mechanism 101 can be implemented to include a touch sensor so that a preview input is produced when a predetermined surface (which can be the same surface that is pressed to produced an activation input or a different surface) of the pushbutton mechanism 101 is touched. Implementing the pushbutton mechanism 101 so that the preview and activation inputs are effected along different axes can be advantageous because such an implementation may make separate control of the preview and activation functionality easier, particularly since the relatively small range of displacement of many conventional pushbutton mechanisms may make such separate control difficult when both the preview and activation inputs are effected by depressing the pushbutton mechanism in the same direction by a particular amount that is specified to correspond to that type of input.

Typically, the pushbutton user interface apparatus 100 includes multiple pushbutton mechanisms 101. In general, the utility of the invention increases as the number of pushbutton mechanisms 101 of the pushbutton user interface apparatus 100 increases. This can be because, for example, the increasingly large number of input options may make it increasingly desirable to obtain an understanding of the input options available before committing to one. Additionally, even when a user has previously used the pushbutton user interface apparatus 100, as the number of pushbutton mechanisms 101 of the pushbutton user interface apparatus 100 increases, it becomes more difficult for a user to recall the function associated with each pushbutton mechanism 101.

Each input sensor 102 of the pushbutton user interface apparatus 100 senses input by the user to one or more of the pushbutton mechanisms 101. An input sensor 102 can be implemented by, for example, any device that can be connected to a pushbutton mechanism 101 so that the device exhibits a change in physical properties in response to displacement of (a displacement sensor), force applied to (a force sensor), or touching of (a touch sensor), the pushbutton mechanism 101. For instance, an input sensor 102 can be implemented by a force-sensitive resistor, a potentiometer or a strain gauge mounted on the underside of a pushbutton cap.

The pushbutton user interface apparatus 100 can be implemented so that one or more input sensors 102 (each input sensor 102 constituting separate apparatus) sense input to a single pushbutton mechanism 101, and it is anticipated that the invention will typically be implemented in this manner. (Multiple input sensors 102 may be used to sense input to a single pushbutton mechanism 101, for example, when the pushbutton user interface apparatus 100 is implemented so that preview and activation of the pushbutton mechanism 101 are actuated by moving the pushbutton mechanism 101 in different directions or along different axes, as discussed further above.) However, the pushbutton user interface apparatus 100 can also be implemented so that one input sensor 102 senses input to multiple pushbutton mechanisms 101. Such an implementation can be constructed in a manner similar to that used in a computer keyboard or other keyboard or keypad interface, in which a single apparatus can sense (discrete) input from multiple keys or input points.

The processing device(s) 103 of the pushbutton user interface apparatus 100 evaluate data produced by the input sensor(s) 102 to determine the type of control that is intended to be effected by the user (i.e., to determine whether the user intends to activate the pushbutton functionality or obtain a preview of that functionality, and, in the latter case, perhaps determine the amount or degree of preview to provide) and perform any other processing functions that are necessary or desirable to implement the pushbutton user interface apparatus 100. A processing device 103 can be implemented using any conventional processing device that is appropriate for use in the pushbutton user interface apparatus 100 as particularly implemented (e.g., that is compatible with the other components of the pushbutton user interface apparatus 100, such as the input sensor(s) 102). Selection of such a processing device can be readily accomplished by those skilled in the art. Further, those skilled in the art can appreciate that there are a large variety of such processing devices.

Each of the preview displays 104 of the pushbutton user interface apparatus 100 produces, in response to a preview input from the user, a display of a preview of the effect of activating a pushbutton mechanism 101. A preview display 104 can appeal to any of the senses, i.e., a preview display 104 can be a visual display, audio display, tactile display, olfactory display or taste display. Typically, the type(s) of the preview display(s) 104 and/or the implementation(s) of the preview display(s) 104 depend on the nature of the functionality associated with the pushbutton mechanism(s) 101. For example, when the pushbutton user interface apparatus 100 is used to select a radio station (as described in more detail below), a preview display 104 can be a display of a radio station corresponding to a pushbutton mechanism 101, the volume of which varies in accordance with the degree of the preview input. Or, for example, when the pushbutton user interface apparatus 100 is used to select a television program (as also described in more detail below), a preview display 104 can be a display of a television station corresponding to a pushbutton mechanism 101, the size of the display varying in accordance with the degree of the preview input.

The pushbutton user interface apparatus 100 can be implemented so that a preview input to a pushbutton mechanism 101 causes the production of one or multiple preview displays 104. Moreover, when multiple preview displays 104 are produced, the preview displays 104 can be of multiple types. For example, the preview displays 104 can include a combination of two or three of a visual display, an audio display and a haptic display. Examples of audio and visual preview displays have been discussed above. A pushbutton user interface apparatus 100 can also be implemented to provide haptic feedback through one or more of the pushbutton mechanisms 101 to, for example, give a tactile or kinesthetic sensation that corresponds to the genre, station or other qualities of audio or video content that is available for selection by the pushbutton mechanism(s) 101. The information upon which the haptic display is based can be automatically extracted from the corresponding content or the information can be human annotations which are broadcast or stored with the content.

The activation apparatus 105 of the pushbutton user interface apparatus 100 effects, in response to an activation input from the user, the functionality associated with the pushbutton mechanism(s) 101. The implementation of the activation apparatus 105 depends on the nature of the functionality associated with the pushbutton mechanism(s) 101. For example, when the pushbutton user interface apparatus 100 is used to select a radio or television station, the activation apparatus 105 is a radio or television, respectively. When the pushbutton user interface apparatus 100 is used to select a link within a Web page, the activation apparatus 105 is software and hardware that effects the display of the content associated with the selected link.

Figure 2:
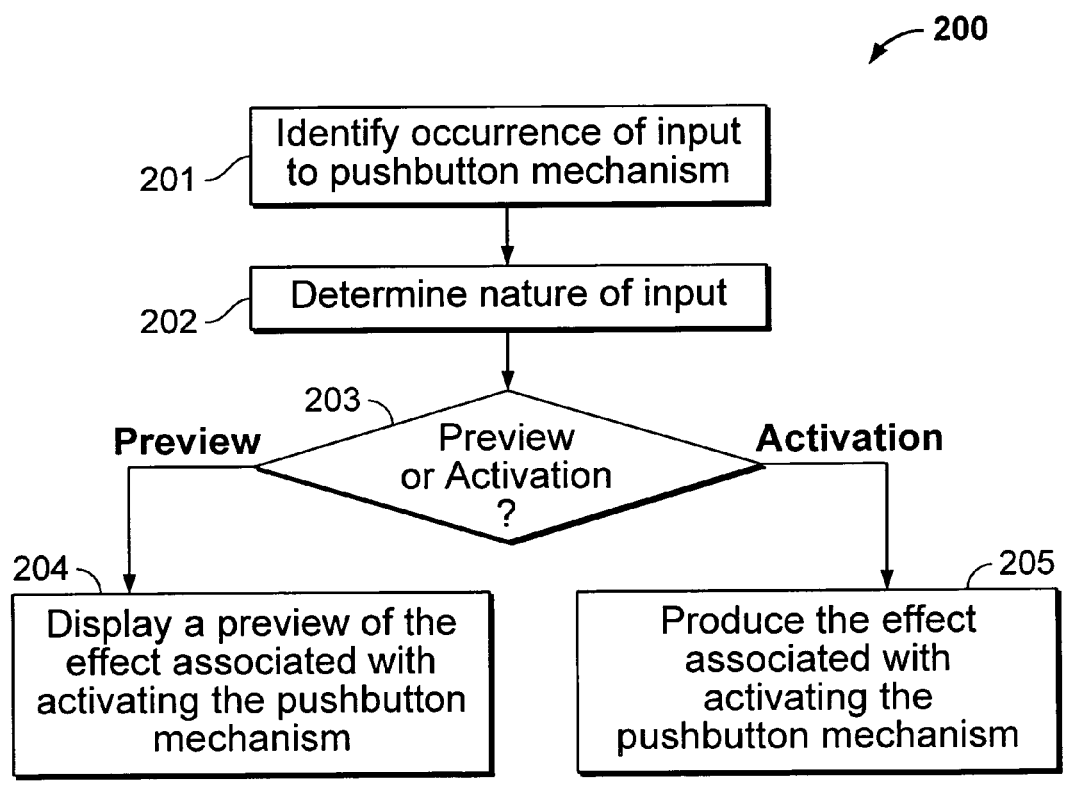
FIG. 2 is a flow chart of a method, according to the invention, of operation of a pushbutton user interface apparatus according to the invention.

FIG. 2 is a flow chart of a method 200, according to the invention, of operation of a pushbutton user interface apparatus according to the invention. The method 200 can be implemented, for example, in the pushbutton user interface apparatus 100 described above with respect to FIG. 1.

In step 201, the occurrence of input to a pushbutton mechanism is identified. For example, depression of a pushbutton mechanism, application of force to a pushbutton mechanism or touching of a pushbutton mechanism can be identified in step 201. In the pushbutton user interface apparatus 100 described above with respect to FIG. 1, step 201 can be performed by the input sensor(s) 102. In the particular embodiment of the invention described below which can be used, for example, to control a radio, step 201 can be performed by the force-sensitive resistors.

As described elsewhere herein, a pushbutton user interface apparatus according to the invention can include multiple pushbutton mechanisms. When the method 200 is used with such a pushbutton user interface apparatus, step 201 can also include an identification of the particular pushbutton mechanism to which the user input has been applied. In such case, in the pushbutton user interface apparatus 100 described above with respect to FIG. 1, step 201 can be performed by the input sensor(s) 102 and the processing device(s) 103.

In step 202, the nature of the input to the pushbutton mechanism is determined. In the pushbutton user interface apparatus 100 described above with respect to FIG. 1, step 202 can be performed by the processing device(s) 103. In the particular embodiment of the invention described below which can be used, for example, to control a radio, step 202 can be performed by the microcontroller.

The determination of the nature of the input to the pushbutton mechanism includes at least a determination of characteristic(s) of the input that enable the input to be identified as either a preview input or an activation input (see step 203, described below). For example, in step 202, a determination can be made of the amount of depression of, or force applied to, a pushbutton mechanism, the amount of depression or applied force determining whether the input is a preview input or an activation input. Or, for example, in the step 202, a determination can be made of which surface has been touched by the user, the surface being touched determining whether the input is a preview input or not.

The method 200 can be implemented so that, in step 202, determination of other characteristic(s) of the input are also made. For example, the invention can be implemented so that the preview display varies in accordance with one or more characteristics of the preview input. For instance, the invention can be implemented so that the amount or degree of a preview display is increased as the preview input to the pushbutton mechanism is asserted to a greater degree (e.g., as the pushbutton mechanism is depressed an increasing amount or subjected to an increasing amount of force). In such case, step 202 of the method 200 can be implemented to determine characteristic(s) of the input which can be used to ascertain the degree with which the preview input is asserted.

In step 203, a determination is made as to whether the user input is a preview input or an activation input. In the pushbutton user interface apparatus 100 described above with respect to FIG. 1, step 203 can be performed by the processing device(s) 103. In the particular embodiment of the invention described below which can be used, for example, to control a radio, step 203 can be performed by the computational device.

As indicated above, the determination made in step 203 is based on one or more characteristics of the user input as determined in step 202. For example, the invention can be implemented so that a preview input is determined to have occurred when a pushbutton mechanism is depressed by less than a specified amount or subjected to less than a specified amount of force, and an activation input is determined to have occurred when the pushbutton mechanism is depressed by greater than a specified amount or subjected to greater than a specified amount of force.

The method 200 can also be implemented so that, in step 203, if the input is determined to be a preview input, the degree with which the preview input is asserted is also determined. As discussed above, this determination can be used to affect the amount or degree of a preview display.

In step 204, if, in step 203, the input has been determined to be a preview input, a preview display is produced, i.e., a display is produced of a preview of the effect associated with activating the pushbutton mechanism. In the pushbutton user interface apparatus 100 described above with respect to FIG. 1, step 204 can be performed by the preview display(s) 104 and, depending upon the particular implementation of the pushbutton user interface apparatus 100, perhaps the processing device(s) 103. The preview display can be, for example, a visual display of text identifying the functionality of the pushbutton mechanism or a spoken (audio) display of words identifying the pushbutton mechanism functionality. Other examples of preview displays that can be produced by a pushbutton user interface apparatus according to the invention are discussed elsewhere herein. As indicated above and discussed further below, in some embodiments of the invention, the amount or degree of the preview display can be variable.

In step 205, if, in step 203, the input has been determined to be an activation input, the effect associated with activating the pushbutton mechanism is produced. In the pushbutton user interface apparatus 100 described above with respect to FIG. 1, step 205 can be performed by the activation apparatus 105 and, depending upon the particular implementation of the pushbutton user interface apparatus 100, perhaps the processing device(s) 103. Activation of a pushbutton mechanism can, for example, cause a particular radio station to be selected. Other examples of effects produced by activation of a pushbutton mechanism are discussed elsewhere herein.

Below, a particular embodiment of the invention is described in detail to illustrate how the invention can be implemented, and to facilitate and enhance understanding of the invention. However, it is to be understood that the invention encompasses implementation using a wide variety of other apparatus and, consistent with the principles of the invention, having a variety of other functionality.

In one embodiment of a pushbutton user interface apparatus according to the invention, a force-sensitive resistor (FSR) or other input sensor (e.g., potentiometer, strain gauge) is mounted to the underside of each of multiple pushbutton caps which are, depending upon the particular implementation of the invention, compliantly or fixedly mounted on an appropriate support structure. The FSRs are operably connected to a microcontroller (e.g., the Microchip PIC16C73 microcontroller) that operates in accordance with one or more computer programs that cause data values to be read by the microcontroller from each FSR as the FSR senses input to the corresponding pushbutton cap. Changes in resistance through the FSR (which correspond to changes in force applied to the pushbutton cap) are read by the microcontroller and resolved as numerical values on a scale from 0 to 255 (i.e., are represented as 8 bit data), thereby indicating how much force has been applied to the pushbutton (which, depending on the particular mechanical implementation of the pushbutton, can correspond to pressure applied to the pushbutton or displacement of the pushbutton). The microcontroller can transmit these values to a computational device. The computational device analyzes the values in accordance with the type of control which the pushbutton is being used to effect. For example, if the pushbuttons are being used to control radio (either conventional radio or Internet radio), as discussed in more detail below, the numbers sent from the microcontroller can be interpreted as a volume of the channel corresponding to the activated pushbutton. A reading of 0 can be interpreted as no volume on the channel corresponding to the pushbutton, while a reading of 255 can be interpreted as a channel selection. Values in between 0 and 255 lead to fade-in or fade-out of the volume of the corresponding channels, depending on whether the FSR measurement is increasing or decreasing.

In an exemplary application of the invention, a pushbutton user interface according to the invention can be used to facilitate selection of a radio station (or other audio channel or recording from among a multiplicity of audio channels or recordings). For example, in one embodiment of such a pushbutton user interface, three pushbuttons are compliantly mounted on a plastic plate. Each pushbutton is preset so that activation of the pushbutton selects a specified radio channel: pushbutton 1 is used to select radio channel 1, pushbutton 2 is used to select radio channel 2, and pushbutton 3 is used to select radio channel 3. Depressing one of the pushbuttons causes the corresponding radio channel to fade in, the degree to which the channel is displayed (i.e., the volume at which the channel is displayed) being based on the amount of displacement of the pushbutton, e.g., as the pushbutton is depressed a greater amount, the corresponding channel is displayed more loudly. Fully depressing a pushbutton causes the corresponding channel to be selected. Thus, a user can have fully depressed pushbutton 1 and be listening solely to channel 1. Running a finger lightly along pushbutton 2 will produce a mix of channels 1 and 2. Running a finger lightly along pushbutton 3 will produce a mix of channels 1 and 3. If something new of interest is heard, a pushbutton can be pushed firmly to engage the new channel, i.e., cause that channel to be displayed by itself. Such a pushbutton user interface according to the invention can be used, for example, as a remote controller for Internet radio. Such a pushbutton user interface can also be used, for example, in a car stereo for switching radio stations or audio tracks.

In another exemplary application of the invention, a pushbutton user interface according to the invention can be used to facilitate viewing of visual content. The pushbutton user interface can implemented so that, as a current set of visual content (e.g., a particular television channel) is being displayed in a primary display window, pressing a pushbutton mechanism causes a secondary display window to appear (in particular, within the primary display window, i.e., a picture-in-picture display), the secondary display window displaying a new set of visual content (e.g., a different television channel) that corresponds to the pushbutton mechanism. The pushbutton user interface can be implemented so that pressing the pushbutton mechanism progressively harder causes the secondary display window to become correspondingly bigger. Firmly pressing the pushbutton mechanism (e.g., depressing the pushbutton mechanism greater than a specified amount) causes the new set of visual content to be displayed in the primary display window. A pushbutton user interface according to the invention as described above enables the size of the secondary display window to be varied (and, depending upon the implementation, varied continuously), unlike user interface apparatus used to produce a conventional picture-in-picture visual display in which the secondary display window remains fixed in size.

In yet another exemplary application of the invention, a pushbutton user interface according to the invention can be used to facilitate viewing of Web-enhanced television. Televisions are beginning to enable television programs to be supplemented by content (e.g., Web pages) obtained via the Internet. For example, a television can be constructed so that a link to a related Web site can be displayed while a television program is being displayed. A remote control can be implemented to include a pushbutton user interface according to the invention so that providing an activation input to a pushbutton mechanism toggles the television display between a display of the television program alone and a display of a Web page corresponding to the link, either alone or together (e.g., overlaid on a part of the television program or displayed on half of the television screen while the television program is displayed on the other half) with the television program). The pushbutton user interface can be further implemented so that providing a preview input to the pushbutton mechanism while the television program is displayed alone controls the display of a sliding screen for displaying part or all of the Web page. For example, the pushbutton user interface can be implemented so that lightly touching the pushbutton mechanism causes the screen to slide out a little, enabling a viewer to begin viewing a part of the Web page. As the pushbutton mechanism is pressed progressively harder, the sliding screen gradually becomes larger. As the screen slides over the display of the television program, a viewer can begin viewing a part of the Web page so that the viewer can decide whether the viewer wants to continue sliding out the screen (i.e., depress the pushbutton further) to see more of the Web page (e.g., the viewer can determine whether the content of the Web page has changed since a last viewing of the Web page). A pushbutton user interface according to the invention as described above can enable Web content related to a television program to be monitored for updates with relatively little disruption to the observation of the television program being shown on the television (and with less disruption than would occur if the remote control only allowed toggling between a display of the television program alone and a display of the Web page alone).

In still another exemplary application of the invention, a pushbutton user interface according to the invention can be used to facilitate browsing of Web pages. Such a pushbutton user interface can be constructed, for example, as part of an input apparatus used with a computational device (e.g., desktop or portable computer, personal digital assistant, Web-enhanced cell phone), such as a mouse, keyboard or keypad, or as part of a remote control used to control a Web-enhanced television, as described above. Providing an activation input to a pushbutton mechanism of the pushbutton user interface causes a highlighted link on a Web page to be selected. The pushbutton user interface can be implemented so that providing a preview input to the pushbutton mechanism causes information about a highlighted link to be displayed before selection of that link, such as the type, age or importance of the highlighted link.

In another exemplary application of the invention, a pushbutton user interface according to the invention can be implemented as part of an input apparatus used with a computer, such as a mouse or keyboard. A pushbutton mechanism of such a computer input apparatus can be used, for example, during interaction by a user with a desktop computer application, to activate a function provided in the desktop computer application (e.g., to display relevant information from a "help" facility of the application). In accordance with the invention, the pushbutton mechanism can be implemented so that a preview input to the pushbutton mechanism produces a display (e.g., audio, visual and/or haptic) of a description of a function that can be activated by the pushbutton mechanism. A pushbutton mechanism of such a computer input apparatus can also be used to continuously control the degree of a function provided in a desktop computer application (e.g., when interacting with a painting program, to control the intensity of the color of a shape while the shape is being drawn). Inputs to the pushbutton mechanism that produce less than full activation of the function associated with the pushbutton (e.g., in a painting program, that produce a muted shade of a color) constitute a preview, in accordance with the invention, of the functionality associated with the pushbutton.

In yet another exemplary application of the invention, a pushbutton user interface according to the invention can be placed on a door, or on or near a doorknob of a door, to relate information about the room on the other side through audio or tactile feedback. Such a pushbutton user interface according to the invention includes a single pushbutton. The pushbutton user interface is implemented so that a preview input to the pushbutton causes a preview display (e.g., an audio and/or a tactile display) to be produced that indicates information about the room (e.g., the temperature and/or humidity of the room, the type of room, the identity of one or more objects in the room) and an activation input unlatches and/or opens the door to enable entry into the room.

The invention has been described above as implemented in a pushbutton user interface. However, the principles of the invention can also be embodied in other user interface apparatus. In general, the principles of the invention can be implemented in any user interface apparatus in which input is provided via mechanical apparatus (and, in particular, mechanical switching apparatus). For example, in the application of the invention described above in which a pushbutton user interface according to the invention is placed on a door, or on or near a doorknob of a door, a user interface apparatus in accordance with the principles of the invention can also be implemented by constructing a doorknob such that rotation of the doorknob a first predetermined amount (e.g., rotation of the doorknob less than a specified amount) can constitute a preview input that produces a preview display as described above, and rotation of the doorknob a second predetermined amount (e.g., rotation of the doorknob greater than a specified amount) can constitute an activation input that opens or unlatches the door. As can be appreciated by those skilled in the art, a doorknob in a user input apparatus as described above can also be constructed so as to sense a preview input in other ways, using sensing apparatus and methods as described above with respect to implementation of a pushbutton user interface according to the invention. Similarly, any type of mechanical switching apparatus (e.g., a toggle switch or a rotary switch) can be constructed so that preview and activation inputs can be provided to the mechanical switching apparatus, thus producing a user input apparatus in accordance with the invention, using apparatus and methods as described above with respect to implementation of a pushbutton user interface according to the invention. For example, a mechanical switching apparatus can be constructed so that movement of the mechanical switching apparatus (e.g., toggle switch or rotary switch) a first predetermined amount can constitute a preview input that produces a preview display, and movement of the mechanical switching apparatus a second predetermined amount can constitute an activation input that produces the functionality associated with the mechanical switching apparatus.

Various embodiments of the invention have been described. The descriptions are intended to be illustrative not limitative. Thus, it will be apparent to one skilled in the art that certain modifications may be made to the invention as described herein without departing from the scope of the claims set out below.

We claim:

1. A physical pushbutton user interface for enabling a user to preview the effect of activating a pushbutton, comprising:
    preview sensing means for sensing an input to the pushbutton that does not produce an activation of the pushbutton, but determines the nature of the input and preview display functionality of the pushbutton; and
    preview display means for displaying, in response to the sensed input, a preview comprising at least a portion of content data that would be provided as output if the pushbutton were activated, wherein the content of the preview varies in accordance with the degree of force applied to the pushbutton.

2. A pushbutton user interface as in claim 1, wherein the preview sensing means further comprises a force-sensitive resistor.

3. A pushbutton user interface as in claim 1, wherein the preview sensing means further comprises a potentiometer.

4. A pushbutton user interface as in claim 1, wherein the preview sensing means further comprises a strain gauge.

5. A pushbutton user interface as in claim 1, wherein the preview display means further comprises a visual display.

6. A pushbutton user interface as in claim 1, wherein the preview display means further comprises an audio display.

7. A pushbutton user interface as in claim 1, wherein the preview display means further comprises a haptic display.

8. A pushbutton user interface as in claim 1, further comprising an activation sensing means for sensing an input to the pushbutton that produces an activation of the pushbutton.

9. A pushbutton user interface as in claim 8, wherein the preview sensing means senses motion of the pushbutton along an axis that is the same as an axis along which the activation sensing means senses motion.

10. A pushbutton user interface as in claim 8, wherein the preview sensing means senses motion of the pushbutton along an axis that is different from an axis along which the activation sensing means senses motion.

11. A pushbutton user interface as in claim 10, wherein the preview sensing means senses motion of the pushbutton along an axis that is orthogonal to an axis along which the activation sensing means senses motion.

12. A pushbutton user interface as in claim 1, wherein the interface enables a user to preview the effect of activating any of a multiplicity of pushbuttons, the pushbutton user interface further comprising means for identifying to which of the multiplicity of pushbuttons an input has been provided, wherein the preview sensing means is adapted to sense an input to the identified pushbutton that does not produce an activation of the identified pushbutton, and the preview display means is adapted to produce, in response to the sensed input, a display of a preview indicating the effect of activating the identified pushbutton.

13. User interface apparatus for enabling a user to preview the effect of activating a mechanical input apparatus, comprising:

preview sensing means for sensing an input to the mechanical input apparatus that does not produce an activation of the mechanical input apparatus, but determines the nature of the input and preview display functionality of the mechanical input apparatus; and preview display means for displaying, in response to the sensed input, a preview comprising at least a portion of content data that would be provided as output if the mechanical input apparatus were activated, wherein the content of the preview varies in accordance with the degree of force applied to the input to the mechanical input apparatus.

14. User interface apparatus as in claim 13, wherein the mechanical input apparatus comprises a doorknob.

15. User interface apparatus as in claim 13, wherein the mechanical input apparatus comprises a mechanical switching apparatus.

16. A method for enabling a user to preview the effect of activating a physical pushbutton, comprising the steps of:

sensing an input to the pushbutton that does not produce an activation of the pushbutton, but determines the nature of the input and preview display functionality of the pushbutton; and displaying, in response to the sensed input, a preview comprising at least a portion of content data that would be provided as output if the pushbutton were activated, wherein the content of the preview varies in accordance with the degree of force applied to the pushbutton.

17. A computer readable storage medium or media on which is stored one or more computer programs for enabling a user to preview the effect of activating a physical pushbutton, the one or more computer programs comprising:

instructions for sensing an input to the pushbutton that does not produce an activation of the pushbutton, but determines the nature of the input and preview display functionality of the pushbutton; and instructions for displaying, in response to the sensed input, a preview comprising at least a portion of content data that would be provided as output if the pushbutton were activated, wherein the content of the preview varies in accordance with the degree of force applied to the pushbutton.

18. A pushbutton user interface as in claim 1, wherein the preview display means further comprises an olfactory display.

19. A pushbutton user interface as in claim 1, wherein the preview display means further comprises a taste display.

* * * * *